(12) United States Patent
Kimura

(10) Patent No.: US 8,914,611 B2
(45) Date of Patent: Dec. 16, 2014

(54) ADDRESS TRANSLATION DEVICE, PROCESSING DEVICE AND CONTROL METHOD OF PROCESSING DEVICE

(75) Inventor: Hiroaki Kimura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 373 days.

(21) Appl. No.: 13/562,414

(22) Filed: Jul. 31, 2012

(65) Prior Publication Data

US 2013/0080735 A1 Mar. 28, 2013

(30) Foreign Application Priority Data

Sep. 26, 2011 (JP) ................................. 2011-209755

(51) Int. Cl.
*G06F 12/10* (2006.01)

(52) U.S. Cl.
CPC ........ *G06F 12/1009* (2013.01); *G06F 12/1027* (2013.01); *G06F 2212/652* (2013.01)
USPC ............. 711/207; 711/E12.061; 711/E12.064

(58) Field of Classification Search
CPC ............ G06F 12/1027; G06F 12/1009; G06F 2212/652
See application file for complete search history.

(56) References Cited

U.S. PATENT DOCUMENTS

| 5,426,750 | A | * | 6/1995 | Becker et al. | 711/207 |
| 5,465,337 | A | * | 11/1995 | Kong | 711/207 |
| 5,479,627 | A | * | 12/1995 | Khalidi et al. | 711/205 |
| 5,717,885 | A | * | 2/1998 | Kumar et al. | 711/207 |
| 5,752,274 | A | * | 5/1998 | Garibay et al. | 711/206 |
| 5,956,756 | A | * | 9/1999 | Khalidi et al. | 711/207 |
| 2003/0018876 | A1 | * | 1/2003 | Zahir et al. | 711/206 |
| 2008/0256303 | A1 | * | 10/2008 | Croxford et al. | 711/144 |
| 2010/0070708 | A1 | * | 3/2010 | Maruyama | 711/118 |

FOREIGN PATENT DOCUMENTS

JP 05-040698 2/1993

\* cited by examiner

*Primary Examiner* — Michael Krofcheck
(74) *Attorney, Agent, or Firm* — Fujitsu Patent Center

(57) ABSTRACT

An address translation buffer (TLB) which holds pairs of virtual addresses and physical addresses by respective page sizes and performs an address translation, a storage unit which holds a pair of a virtual address removed from the TLB and page size corresponding thereto when a pair of a new virtual address and physical address read from a page table is registered to the TLB, base registers which hold a base address by each page size are held. The TLB is searched based on a translation object virtual address included in a memory access request, and when a TLB miss occurs, a main storage is searched based on a pointer address generated from information held by the storage unit and the base register, and the translation object virtual address is translated into the physical address.

11 Claims, 6 Drawing Sheets

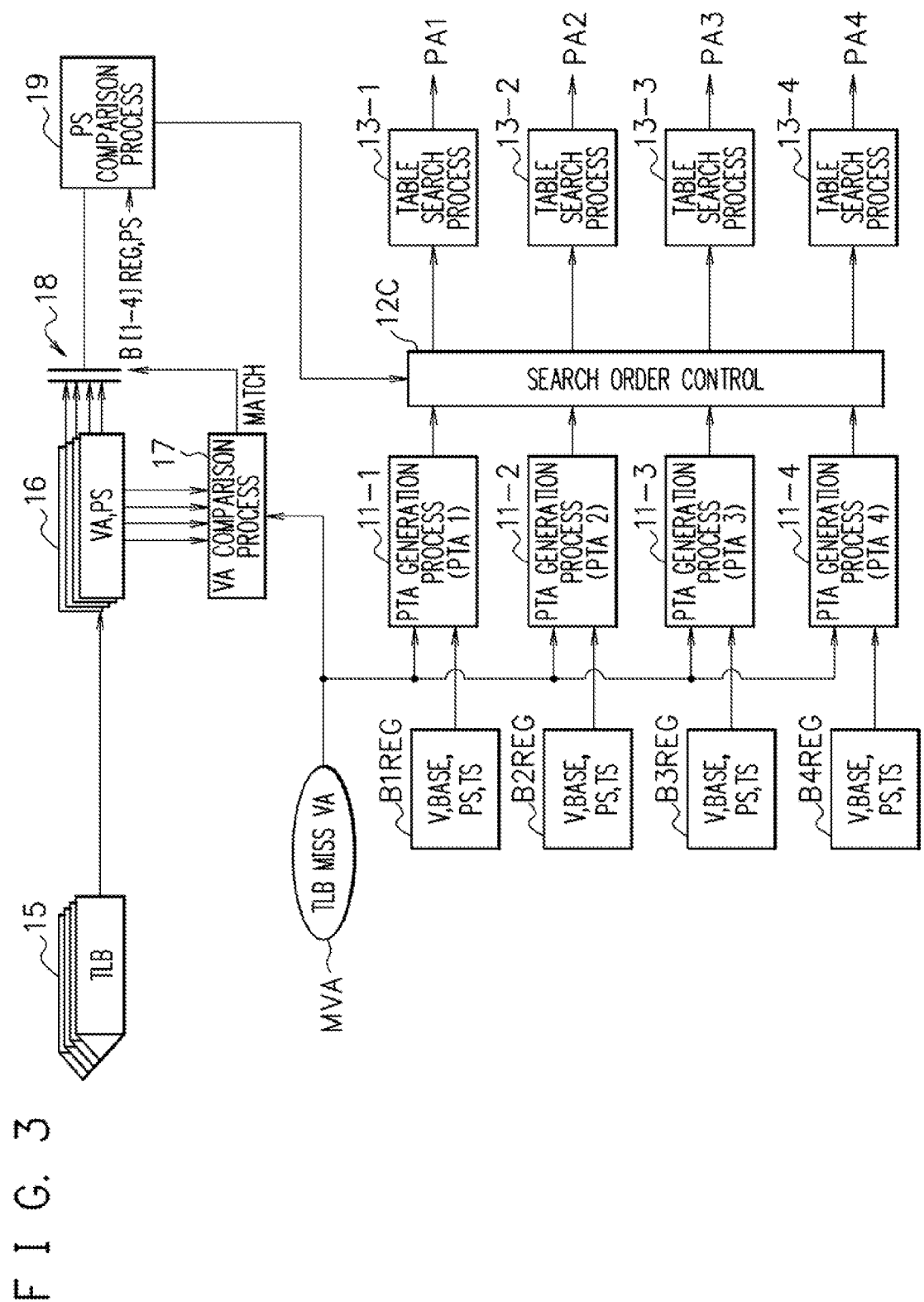
F I G. 3

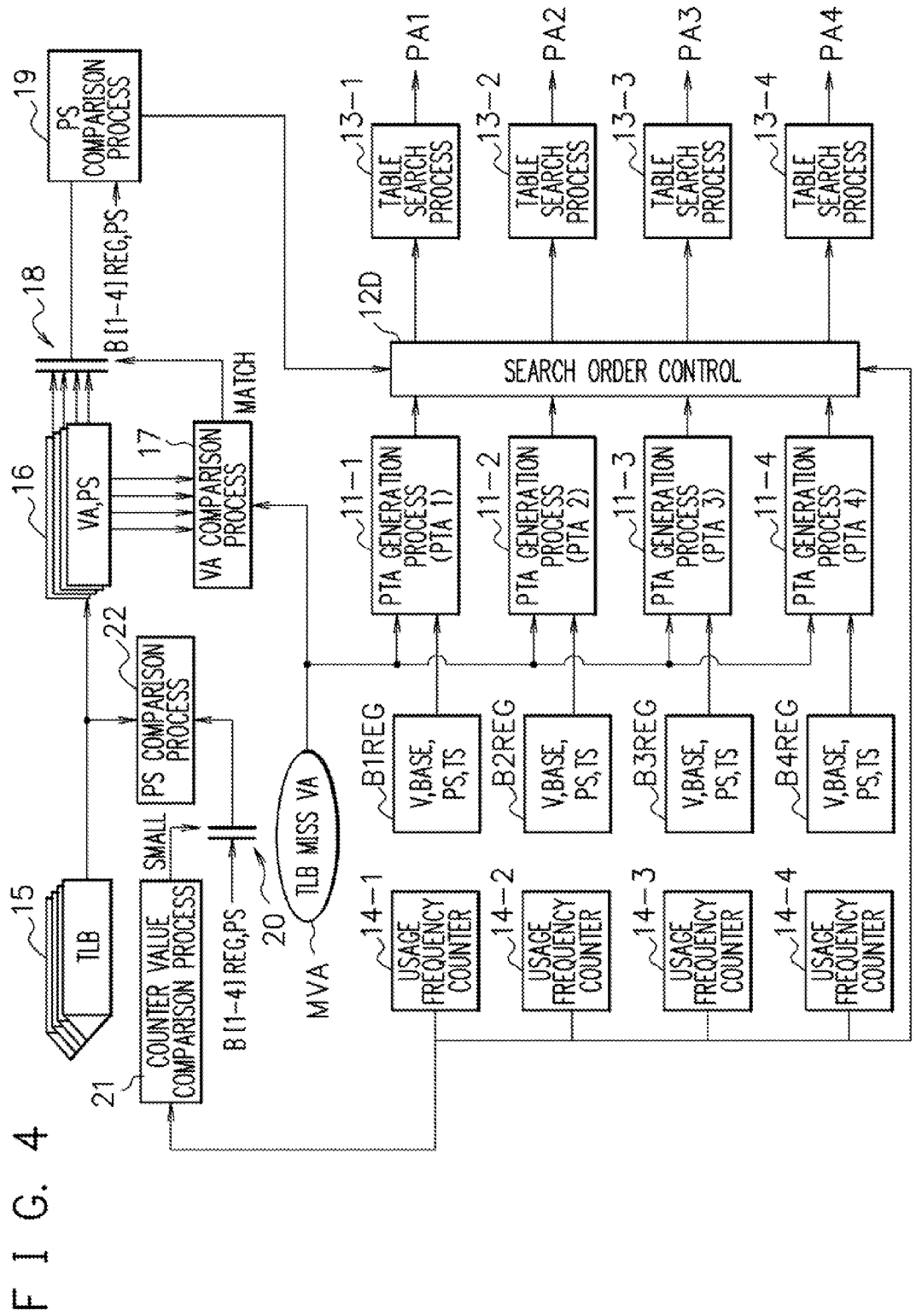
F I G. 4

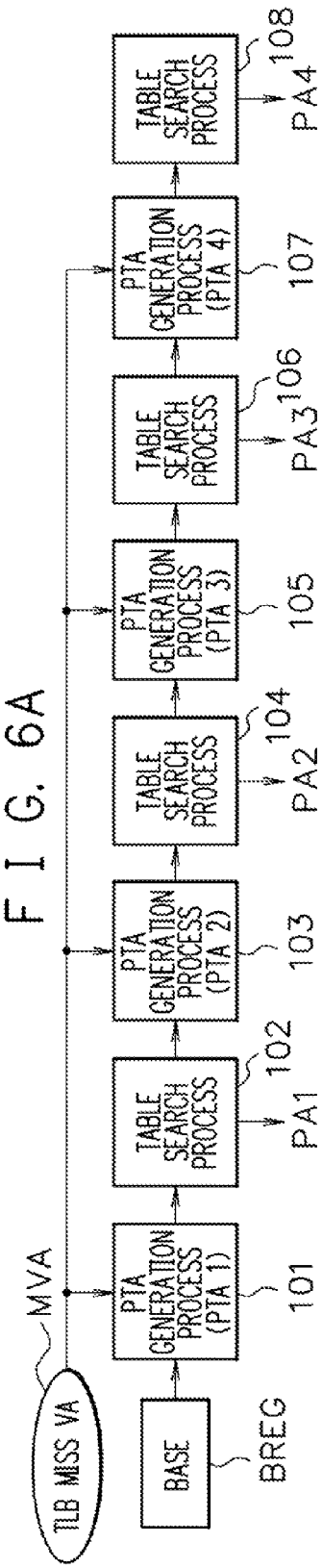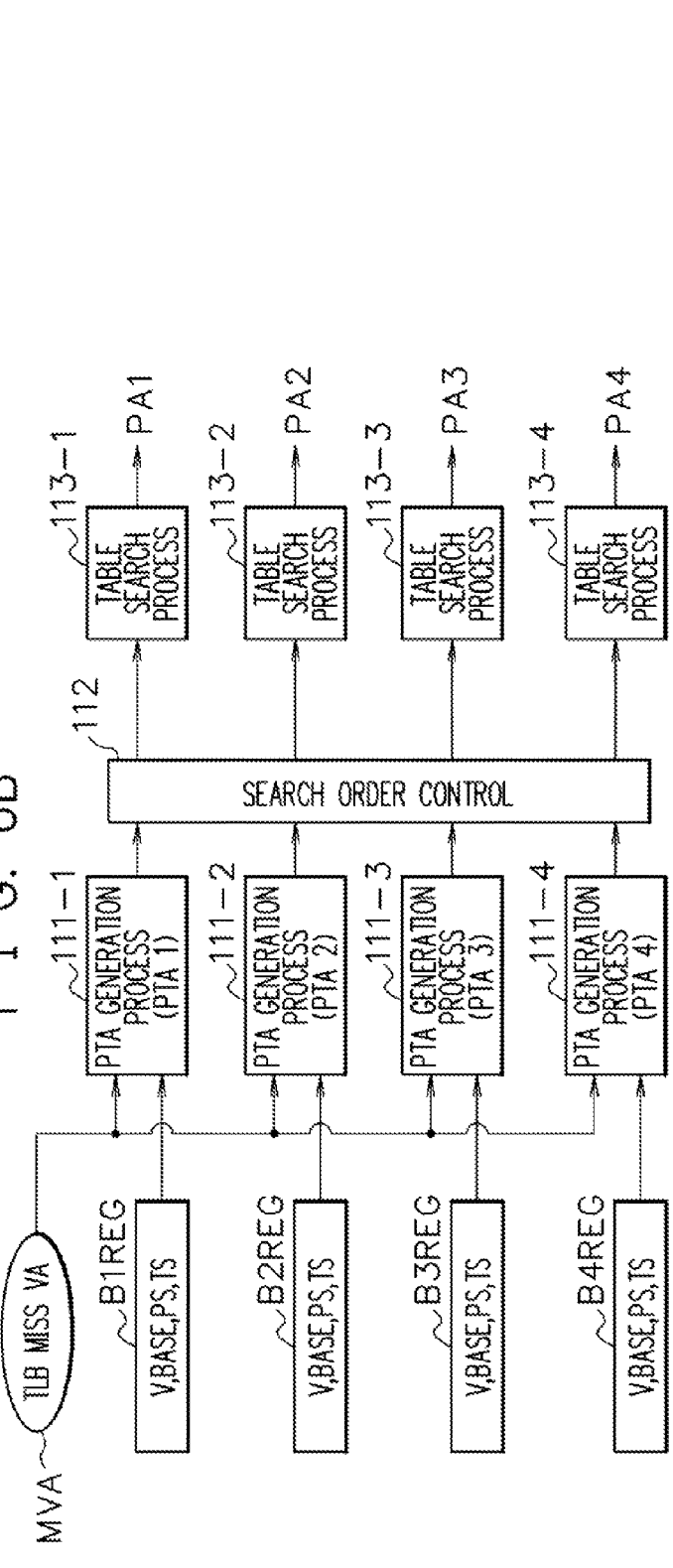

US 8,914,611 B2

ADDRESS TRANSLATION DEVICE, PROCESSING DEVICE AND CONTROL METHOD OF PROCESSING DEVICE

CROSS-REFERENCE TO RELATED APPLICATION

This application is based upon and claims the benefit of priority of the prior Japanese Patent Application No. 2011-209755, filed on Sep. 26, 2011, the entire contents of which are incorporated herein by reference.

FIELD

The embodiment discussed herein is directed to an address translation device, a processing device and a control method of the processing device.

BACKGROUND

There is a virtual storage system equipped with an address translation mechanism by means of hardware, and using a paging system capable of processing plural page sizes. In the virtual storage system, an address translation lookaside buffer (TLB) is used to perform an address translation from a virtual address (VA) to a physical address (PA) in high speed.

In the virtual storage system as stated above, it is performed to search page tables disposed at a main storage by respective page sizes when a TLB miss occurs in a memory access by a processor. Entries (address translation information) representing a correspondence between the virtual address and the physical address are stored in the page table. If the page table having an entry corresponding to the virtual address where the TLB miss occurs is found as a result of the search of the page table, the entry is registered to the TLB. On the other hand, when the page table having the corresponding entry is not found, the entry is registered to the TLB after the page table having the corresponding entry is prepared by means of software. For example, there are modes as illustrated in FIG. 6A and FIG. 6B as search modes of the page tables disposed at the main storage.

In the search mode illustrated in FIG. 6A, a base register BREG in which a base address for a pointer address generation is stored is held to search the page table disposed at the main storage. The base register BREG corresponds to a certain page size (a first page size), and a first base address BASE used for the search of the page table corresponding to the first page size is stored therein.

When the TLB miss occurs at the memory access time, a first pointer address PTA1 is generated from a part of a virtual address MVA where the TLB miss occurs and the first base address BASE stored at the base register BREG by a PTA generation process 101. The first pointer address PTA1 is a pointer address to search the page table corresponding to the first page size from the main storage. In a table search process 102, the page table corresponding to the first page size is read from a region of the address indicated by the first pointer address PTA1. When an entry corresponding to the virtual address MVA of the TLB miss is found from the read page table, the entry is registered to the TLB, a physical address PA1 corresponding to the virtual address MVA is output, and the address translation process by means of the hardware finishes.

On the other hand, when the entry corresponding to the virtual address MVA is not found from the read page table, a second pointer address PTA2 to search a page table corresponding to a second page size from the main storage is generated by a PTA generation process 103. Here, a second base address used for the search of the page table corresponding to the second page size is stored at a region of the address indicated by the first pointer address PTA1. In the PTA generation process 103, a second pointer address PTA2 is generated from the part of the virtual address MVA where the TLB miss occurs and the second base address.

In a table search process 104, the search of the page table corresponding to the second page size is performed as same as the case of the first page size by using the generated second pointer address PTA2. When the entry corresponding to the virtual address MVA of the TLB miss is found from the page table as a result of the search, the entry is registered to the TLB, a physical address PA2 corresponding to the virtual address MVA is output, and the address translation process finishes. Hereinafter, when the entry corresponding to the virtual address MVA of the TLB miss is not found, PTA generation processes 105, 107 and table search processes 106, 108 relating to each page size are sequentially performed until the corresponding entry is found.

In the search mode illustrated in FIG. 6A, the page table search for once is performed when the physical address corresponding to the virtual address MVA of the TLB miss is the physical address PA1, and the page table searches for twice are performed when it is the physical address PA2. Similarly, the page table searches for three times are performed when the physical address corresponding to the virtual address MVA of the TLB miss is a physical address PA3, and the page table searches for four times are performed when it is a physical address PA4. Accordingly, memory accesses for the number of times corresponding to the number of supported page sizes occur at the most for the page table searches in the search mode illustrated in FIG. 6A. Besides, it is impossible to control a search order of the page tables corresponding to the page sizes in the search mode illustrated in FIG. 6A.

In the search mode illustrated in FIG. 6B, the base registers each storing the base address for the pointer address generation are held for the number of supported page sizes to search the page tables disposed at the main storage. A valid bit V, the base address BASE, a page size PS, and a table size TS used for the search of the page table, and so on are stored at each of base registers B1REG, B2REG, B3REG, B4REG.

When the TLB miss occurs, a pointer address of the page table corresponding to the page size is generated from a part of the virtual address MVA where the TLB miss occurs and the base address BASE stored at one of the base registers by a PTA generation process 111. In a table search process 113, the page table is read from a region of the address indicated by the pointer address. When an entry corresponding to the virtual address MVA of the TLB miss is found from the read page table, the entry is registered to the TLB, a physical address corresponding to the virtual address MVA is output, and the address translation process by means of the hardware finishes.

On the other hand, when the entry corresponding to the virtual address MVA is not found from the read page table, the base address BASE is taken out from another base register. The pointer address of the page table corresponding to the page size is generated from the part of the virtual address MVA of the TLB miss and the base address BASE which is taken out this time by the PTA generation process 111. The page table is similarly searched from a region of the address indicated by the pointer address by the table search process 113 and the address translation process is performed.

In the search mode illustrated in FIG. 6B, it is performed to control whether the search of the page tables is performed sequentially or in parallel by a search order control mechanism 112. When the search of the page tables is performed sequentially, a priority order of information of which base register is to be used is fixed, and the search of the page tables corresponding to the page sizes is performed according to that order and is fixed. When the page table is searched sequentially, the address translation process finishes when the entry corresponding to the virtual address MVA of the TLB miss is registered to the searched page table without performing the search of the subsequent page tables. However, when the entry corresponding to the virtual address MVA of the TLB miss is not found in the searched page table, memory accesses for the number of times corresponding to the number of base registers occur at the most for the page table search. Besides, when the page tables are searched in parallel, the memory accesses for the number of base registers occur for the page table search. As stated above, in the search mode illustrated in FIG. 6B, the memory accesses for once to the number of valid base registers at the most occur for the page table search as for one TLB miss.

In the following Patent Document 1, a page management mode of a main storage in which a usage frequency counter counting a usage frequency of pages is held as for the main storage having pages of a certain size for "n" pages and an exchange of pages is performed in accordance with the usage frequency, is proposed.

[Patent Document 1] Japanese Laid-Open Patent Publication No. 05-40698

Here, the entry of the page table actually registered to the TLB and used as for one TLB miss is only one entry corresponding to the virtual address where the TLB miss occurs.

In the search mode illustrated in FIG. 6A, the address translation process finishes by the page table search (memory access) for once if the entry corresponding to the virtual address of the TLB miss exists at the page table searched by the first pointer address PTA1. However, when the entry corresponding to the virtual address of the TLB miss does not exist at the searched page table, the plural number of times of page table searches (memory accesses) are performed until the corresponding entry is found. Accordingly, there is a problem in which the memory accesses (requests) caused by a useless table fetch occur frequently. Besides, there is a problem in which a cache memory is contaminated because the entries of unnecessary page tables are registered to the cache memory. Further, there is a possibility in which the search is performed from the unnecessary page table, and a process time of the page table search increases.

Besides, in the search mode illustrated in FIG. 6B, there is a similar problem as the search mode illustrated in FIG. 6A if the search of the page table is performed sequentially. There are the problems in which the memory accesses (requests) caused by the useless table fetch occur frequently and the cache memory is contaminated because the entries of the unused page tables are registered to the cache memory even when the searches of the page tables are performed in parallel.

SUMMARY

In an aspect of an address translation device, an address translation buffer holding pairs of virtual addresses and physical addresses by respective page sizes, and performing a translation between the virtual address and the physical address; a history holding unit holding a pair of a virtual address removed from the address translation buffer and page size corresponding thereto when a pair of a new virtual address and physical address read from a page table holding pairs of virtual addresses and physical addresses is registered to the address translation buffer; base registers each holding a base address by each page size; and a memory management unit are included. The memory management unit searches the address translation buffer based on a translation object virtual address included in a memory access request issued by an instruction control unit, and when a search miss occurs, searches the pairs of the virtual addresses and physical addresses held by the main storage device based on a pointer address indicating an address of the page table at the main storage device generated from the pair of the virtual address and page size held by the history holding unit and the base address held by the base register, and translates the translation object virtual address into the physical address.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a view schematically illustrating an example of a second search mode of the page tables according to the embodiment;

FIG. 4 is a view schematically illustrating an example of a third search mode of the page table according to the embodiment;

FIG. 6A and FIG. 6B are views schematically illustrating examples of search modes of the page tables.

DESCRIPTION OF EMBODIMENTS

Hereinafter, preferred embodiments will be explained with reference to accompanying drawings.

At first, search modes of page tables according to the embodiments are described. The search modes of the page tables described in the following are each a search mode according to a search of a page table disposed at a main storage performed when a TLB miss occurs in a memory access. Note that in the following description, an operation mode in which a control of a search order is performed to sequentially search the page tables is also called as a "sequential mode", and an operation mode in which the control of the search order is performed to search plural page tables in parallel is also called as a "parallel mode".

<First Search Mode>

Figure 1:
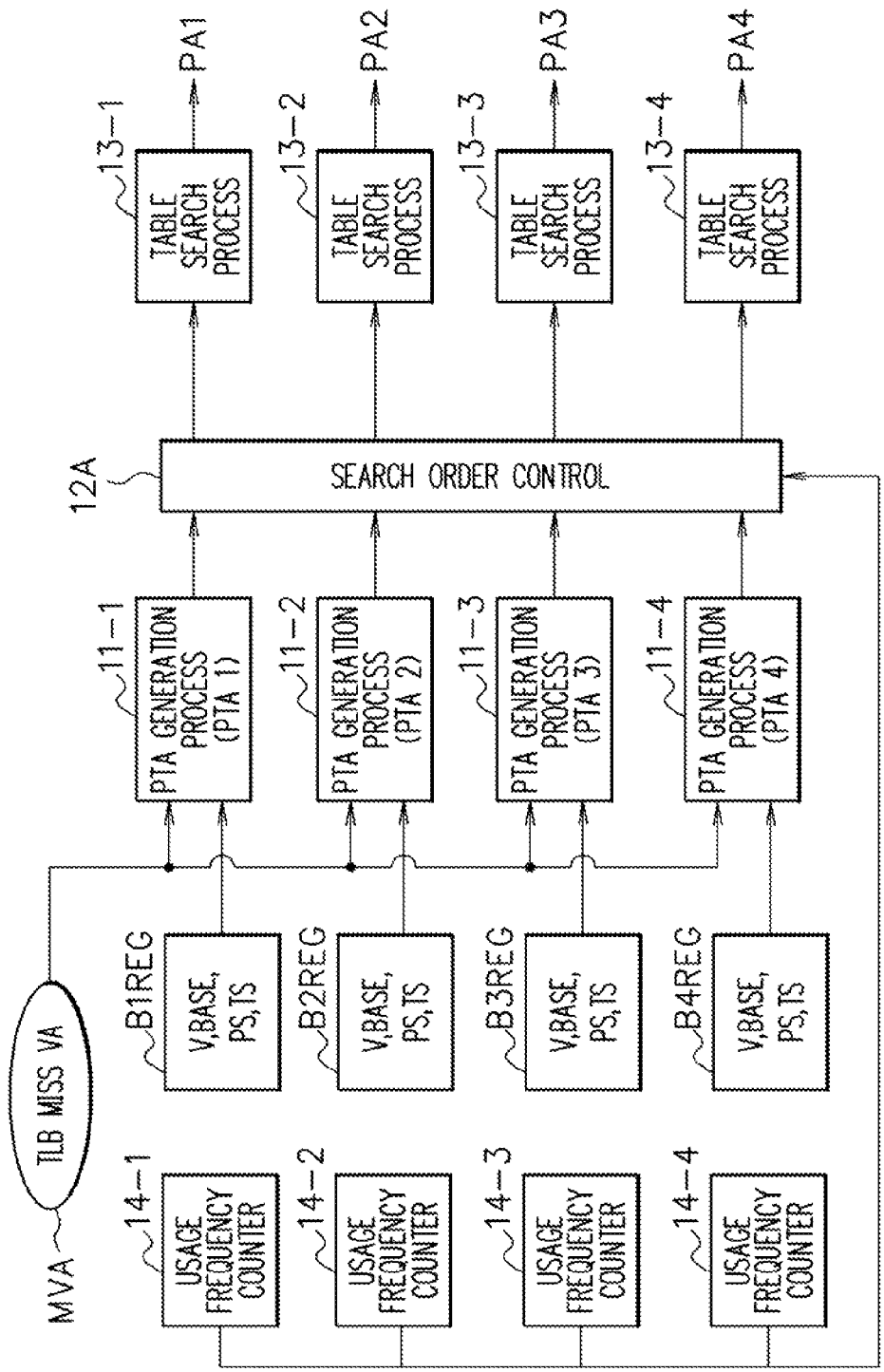
FIG. 1 is a view schematically illustrating an example of a first search mode of page tables according to a present embodiment.

FIG. 1 is a view schematically illustrating an example of a first search mode of page tables in the present embodiment. In the first search mode of the page tables, usage frequency counters to count the number of times when the page table is hit at a searching time of the page tables are provided by respective base registers, and a search order of the page tables is controlled in accordance with counter values thereof. The "page table is hit" means that an entry corresponding to a virtual address where a TLB miss occurs exists at the page table. Hereinafter, the virtual address where the TLB miss occurs is also called just as "the virtual address of the TLB miss".

In FIG. 1, each of base registers BiREG ("i" is a subscript, and "i"=1, 2, 3, 4. It is the same in the following.) is a register storing a base address BASE for a pointer address generation to search the page tables disposed in the main storage. The base registers BiREG are provided, for example, for each of supported page sizes. For example, a valid bit V, a page size PS, a table size TS and so on in addition to the base address BASE are stored in each of the base registers BiREG. The valid bit V indicates whether or not information stored at the base register BiREG is valid. The page size PS indicates a page size to which information stored at the base register BiREG is corresponding among the supported plural page sizes. The table size TS indicates a size of the page table.

In a PTA generation process 11-i, a pointer address PTAi of the page table corresponding to the page size PS is generated from a part of the virtual address MVA where the TLB miss occurs and the base address BASE stored at the base register BiREG. A search order control mechanism 12A controls a search order of the page tables based on counter values of usage frequency counters 14-i provided by respective base registers BiREG. A table search process 13-i is performed in accordance with the search order defined by the search order control mechanism 12A.

In the table search process 13-i, the page table is read from a region of the address indicated by the pointer address PTAi generated by the corresponding PTA generation process 11-i, and it is searched whether or not an entry corresponding to the virtual address MVA of the TLB miss exists. When the entry corresponding to the virtual address MVA of the TLB miss is found from the read page table, the entry is registered to the TLB, and a physical address PAi corresponding to the virtual address MVA is output in the table search process 13-i. A search result in the table search process 13-i is reported to the search order control mechanism 12A and so on.

The usage frequency counter 14-i counts the number of times in which the page table read based on the pointer address PTAi generated from the base address BASE stored at the corresponding base register BiREG is hit in the past. In the usage frequency counter 14-i, the counter value is incremented for one (+1) when, for example, the page table read based on the pointer address PTAi is hit. Note that, for example, the counter values of all usage frequency counters 14-i are cleared or set to an arbitrary value when the counter value reaches a maximum value, or overflows in any of the usage frequency counters 14-i. Besides, the counter values of all usage frequency counters 14-i may be decremented for one (−1). Besides, for example, the counter values of all usage frequency counters 14-i are cleared or set to an arbitrary value when any of the base registers BiREG is updated because the counter values up to that time do not make sense.

In the sequential mode sequentially searching the page tables at the main storage in the first search mode, the search order control mechanism 12A controls such that the search of the page tables is performed in an order of the page size corresponding to the base register BiREG of which counter value of the usage frequency counter 14-i is large. It is thereby possible to perform the search of the page tables while giving priority to the base register BiREG storing the base address BASE to search the page table of which hit rate in the past is high. Namely, it is possible to perform the search of the page tables in an order of having high possibility in which the entry corresponding to the virtual address MVA of the TLB miss exists therein, and to suppress occurrences of unnecessary memory accesses (requests). Besides, it is possible to suppress that an entry of an unnecessary page table is registered to a cache memory, and to prevent that the cache memory is contaminated.

Note that the page tables according to plural number of base registers BiREG, namely the page tables corresponding to plural page sizes may be simultaneously searched when the counter values of the plural usage frequency counters 14-i reach a threshold value even in the sequential mode. For example, the base registers BiREG corresponding to the usage frequency counters 14-i of which counter values are large among the usage frequency counters 14-i of which counter values reach the threshold value may be simultaneously performed the search of the page tables. It is thereby possible to reduce time taken for a change of the page sizes of which page tables are to be searched and to reduce a time required for an address translation process when, for example, two page sizes are used in even frequency.

Besides, in the parallel mode in which the page tables at the main storage are searched in parallel in the first search mode, the search order control mechanism 12A controls such that the page tables corresponding to the plural number of base registers BiREG of which counter values of the usage frequency counters 14-i are large are simultaneously searched. Note that the number of page tables simultaneously searched is less than the total number of base registers BiREG. It is thereby possible to simultaneously perform the search of the page tables while giving priority to some of the base registers BiREG each storing the base address BASE to search the page table of which hit rate in the past is high without simultaneously searching all page tables. Accordingly, it is possible to suppress the occurrences of the unnecessary memory accesses (requests). Besides, it is possible to suppress that the entries of the unnecessary page tables are registered to the cache memory, and to prevent that the cache memory is contaminated.

Figure 2:
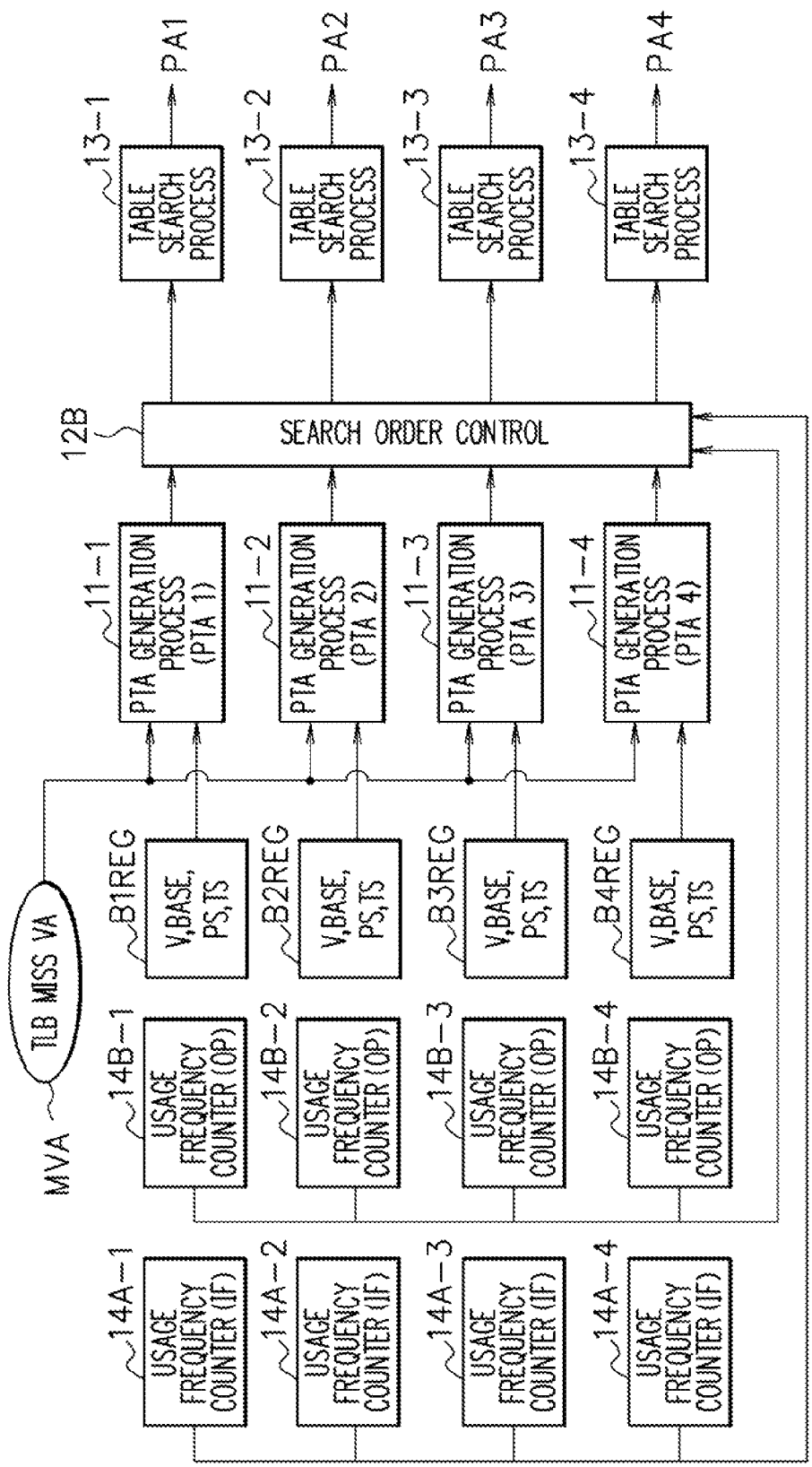
FIG. 2 is a view schematically illustrating another example of the first search mode of the page tables according to the embodiment.

Note that when the base register BiREG is commonly used for instruction and for operand, a usage frequency counter for instruction 14A-i and a usage frequency counter for operand 14B-i may be provided by each base register BiREG as illustrated in FIG. 2. FIG. 2 is a view schematically illustrating another example of the first search mode of the page tables in the embodiment. In FIG. 2, the same reference numerals and symbols are added for components having the same function as the components illustrated in FIG. 1, and redundant description is not given.

In FIG. 2, functions as the counters of the usage frequency counter for instruction (IF) 14A-i and the usage frequency counter for operand (OP) 14B-i are similar to the usage frequency counter 14-i illustrated in FIG. 1. The usage frequency counter for instruction (IF) 14A-i is used in an instruction access, and the usage frequency counter for an operand (OP) 14B-i is used for an operand access. Namely, when the page table is hit in the instruction access, the counter value of the usage frequency counter for instruction (IF) 14A-i corresponding to the base register BiREG used for the generation of the pointer address PTAi is incremented for one. Similarly, when the page table is hit in the operand access, the counter value of the usage frequency counter for operand (OP) 14B-i corresponding to the base register BiREG used for the generation of the pointer address PTAi is incremented for one.

A search order control mechanism 12B corresponds to the search order control mechanism 12A illustrated in FIG. 1, and controls the search order of the page tables based on the counter values of the usage frequency counter for instruction (IF) 14A-i and the usage frequency counter for operand (OP) 14B-i. The search order control mechanism 12B controls the search order of the page tables based on the counter value of the usage frequency counter for instruction (IF) 14A-i when the search of the page tables is performed in the instruction access. Besides, the search order control mechanism 12B controls the search order of the page tables based on the counter value of the usage frequency counter for operand (OP) 14B-i when the search of the page tables is performed in the operand access.

<Second Search Mode>

FIG. 3 is a view schematically illustrating an example of a second search mode of the page tables in the present embodiment. In FIG. 3, the same reference numerals and symbols are used for components having the same function as the components illustrated in FIG. 1, and redundant description is not given. In the second search mode of the page tables, history information of an entry removed from the TLB caused by a registration of a new entry is stored for a predetermined number. When the page tables are sequentially searched, the search order of the page tables is determined with reference to the stored history information to search the page tables.

In FIG. 3, an address translation buffer (TLB: Translation Lookaside Buffer) 15 holds (cache) a part of the page tables disposed at the main storage, and performs an address translation from a virtual address to a physical address. A storage unit 16 stores the history information of the entry removed from the TLB 15 caused by the registration of the new entry. The history information includes, for example, a virtual address VA and a page size PS. In a virtual address comparison process 17, the virtual address MVA where the TLB miss occurs and the virtual address VA stored at the storage unit 16 as the history information are compared, and it is notified to a selection unit 18 when they are matched.

The selection unit 18 receives the notification from the virtual address comparison process 17, and takes out and outputs the page size PS of the history information in which the virtual address MVA of the TLB miss and the stored virtual address VA are matched. In a page size comparison process 19, the page size output from the selection unit 18 and the page size stored at the valid base register BiREG are compared, and a comparison result is notified to a search order control mechanism 12C.

The search order control mechanism 12C controls the search order of the page tables with reference to the comparison result at the page size comparison process 19 in the sequential mode sequentially searching the page tables at the main storage. In detail, the search order control mechanism 12C controls such that the page table according to the base register BiREG is performed first when there is the base register BiREG in which the page size output from the selection unit 18 in the page size comparison process 19 and the stored page size are matched. A table search process 13-i is performed in accordance with the search order determined by the search order control mechanism 12C.

As stated above, the search of the page tables is performed while giving priority to the base register BiREG corresponding to the page size of which virtual address matches with the virtual address MVA of the TLB miss with reference to the entry removed from the TLB 15 to register the new entry in the second search mode. It is thereby possible to perform the search from a necessary page table, and the time required for the search of the unnecessary page tables can be saved, the time required for the address translation can be reduced, at the same time, the occurrences of the unnecessary memory accesses (requests) can be suppressed. Besides, it is possible to suppress that the entry of the unnecessary page table is registered to the cache memory, and to prevent that the cache memory is contaminated.

<Third Search Mode>

FIG. 4 is a view schematically illustrating an example of a third search mode of the page tables in the present embodiment. In FIG. 4, the same reference numerals and symbols are added for components having the same function as the components illustrated in FIG. 1 and FIG. 3, and redundant description is not given. The third search mode of the page tables illustrated in FIG. 4 is a search mode in which the above-stated first search mode and second search mode are combined.

In FIG. 4, when the page tables are sequentially searched, a search order control mechanism 12D controls the search order of the page tables in accordance with the above-stated second search mode, and thereafter, controls the search order of the page tables in accordance with the above-stated first search mode. For example, the search order control mechanism 12D refers to the history information stored at the storage unit 16, and controls to search the page tables while giving priority to the base register BiREG corresponding to the page size of which virtual address matches with the virtual address MVA of the TLB miss. As a result of the search, when the entry corresponding to the virtual address MVA of the TLB miss is not hit, the search order control mechanism 12D controls to search the page tables in an order of the page size corresponding to the base register BiREG of which counter value of the usage frequency counter 14-i is large. At this time, the search order of the page tables is controlled while excluding the base register BiREG of which search of the page table is already performed because the virtual address stored at the history information matches with the virtual address MVA of the TLB miss. Accordingly, it is also possible in the third search mode to suppress the occurrences of the unnecessary memory accesses (requests) as same as the above-stated first search mode and the second search mode. Besides, it is possible to suppress that the entry of the unnecessary page table is registered to the cache memory and to prevent that the cache memory is contaminated.

In the third search mode illustrated in FIG. 4, whether or not the entry removed from the TLB 15 so as to further register the new entry is to be stored as the history information is determined with reference to the counter value of the usage frequency counter 14-i. A selection unit 20 outputs the page size stored at the base register BiREG corresponding to the usage frequency counter 14-i of which counter value is judged to be small by a counter value comparison process 21. In a page size comparison process 22, the page size output from the selection unit 20 and the page size of the entry removed from the TLB 15 caused by the registration of the new entry are compared, and it is permitted that the entry is stored at the storage unit 16 as the history information when the page sizes are matched.

As stated above, the entry which is stored at the storage unit 16 as the history information is limited to the entry of the page size of which counter value of the usage frequency counter 14-i is small, namely of which reference frequency is low (the hit rate of the page table is low). It is thereby possible to increase a possibility in which the entry of the page size of which reference frequency is low remains as the history information even if the number of entries capable of being held as the history information is decreased only the entry of the page size of which reference frequency is low is registered as the history information. Accordingly, the page size of which reference frequency is low is predicted by the above-stated second search mode, and the page size of which reference frequency is high is predicted by the above-stated first search mode. It is thereby possible to predict the page size to be used regardless of the reference frequency of the page size of a translation object address.

Figure 5:
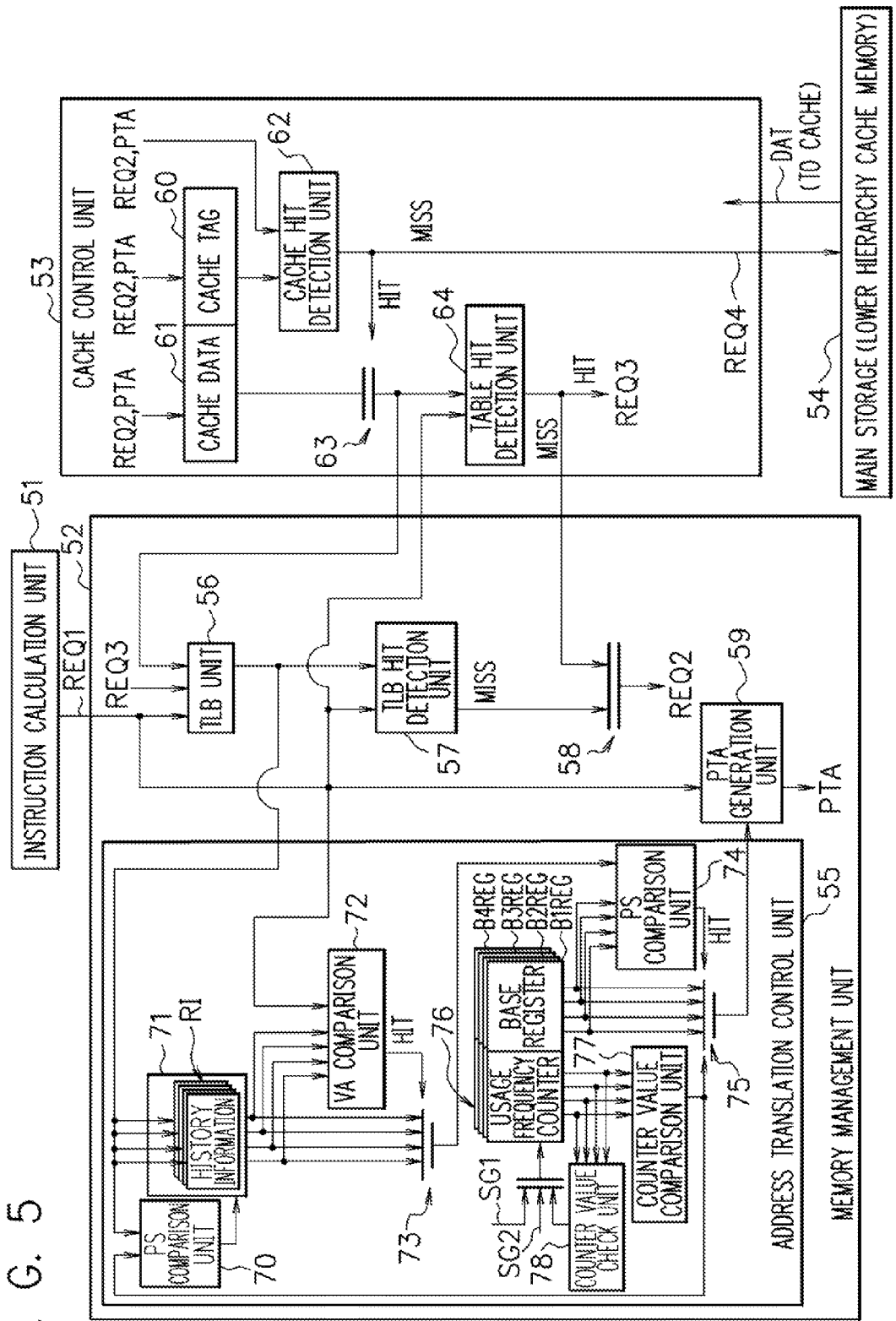
FIG. 5 is a view illustrating a configuration example of a processor system according to the embodiment.

Next, a processor system enabling the page table search in the above-stated each search mode is described. FIG. 5 is a view illustrating a configuration example of the processor system in the present embodiment.

In FIG. 5, a reference numeral 51 is an instruction calculation unit, a reference numeral 52 is a memory management unit, a reference numeral 53 is a cache control unit and a reference numeral 54 is a main storage (or a lower hierarchy cache memory). The memory management unit 52 includes an address translation control unit 55, an address translation buffer unit (TLB unit) 56, a TLB hit detection unit 57, an output unit 58 and a pointer address (PTA) generation unit 59. The cache control unit 53 includes a cache tag unit 60, a cache data unit 61, a cache hit detection unit 62, an output unit 63 and a table hit detection unit 64. Besides, the address translation control unit 55 includes a page size comparison unit 70, a storage unit 71, a virtual address comparison unit 72, an output unit 73, a page size comparison unit 74, an output unit 75, usage frequency counters 76, base registers BiREG, a counter value comparison unit 77 and a counter value check unit 78. The function of the above-stated search order control mechanism is enabled by the page size comparison unit 74, the output unit 75 and the counter value comparison unit 77.

Note that the configuration of the processor system illustrated in FIG. 5 is an example, and it is not limited thereto. For example, the TLB unit 56, the cache tag unit 60, the cache data unit 61, the base registers BiREG, the storage unit 71, and so on may be separated for instruction and for operand, or may be commonly used. Besides, the number of base registers BiREG (and the corresponding usage frequency counters 76) and history information RI stored at the storage unit 71 are also arbitrary. Besides, there is no restriction as for a hierarchical structure of the TLB unit 56.

Processes in the processor system illustrated in FIG. 5 are described.

[Process A]

At first, when a memory access request REQ1 of an instruction/operand using a virtual address is issued from the instruction calculation unit 51 performing a control of a process flow to be executed, calculation, and so on, the memory management unit 52 performs a search whether or not the entry corresponding to the virtual address exists at the TLB unit 56. The TLB unit 56 holds (cache) a part of the page table. Namely, entries having correspondence information between the virtual address and the physical address are stored at the TLB unit 56. Basically, the virtual address is stored as a TLB tag, and the physical address is stored as a TLB data.

The part of the virtual address in the memory access request REQ1 is supplied to the TLB unit 56 as an index, and the TLB tag of the entry corresponding to the index is supplied from the TLB unit 56 to the TLB hit detection unit 57. The TLB hit detection unit 57 compares the TLB tag supplied from the TLB unit 56 and the part of the virtual address in the memory access request REQ1 corresponding to the TLB tag. As a result of the comparison, when the TLB tag and the part of the virtual address match, namely when the entry corresponding to the virtual address in the memory access request REQ1 exists at the TLB unit 56, the memory management unit 52 translates the virtual address into the physical address by using the entry. The cache control unit 53 executes an instruction fetch, an operand fetch, an operand store, and so on for the translated physical address.

On the other hand, when the TLB tag and the part of the virtual address do not match, namely when the entry corresponding to the virtual address in the memory access request REQ1 does not exist at the TLB unit 56 (a case of TLB miss), the TLB hit detection unit 57 asserts a TLB miss signal. When the TLB miss signal is asserted, the output unit 58 uses it as a trigger and issues a first table search request REQ2 to the address translation control unit 55 and the cache control unit 53.

[Process B]

When the first table search request REQ2 is issued, the virtual address comparison unit 72 compares the virtual address where the TLB miss occurs and the virtual address stored at the storage unit 71 as the history information RI in the address translation control unit 55. When the history information RI storing the virtual address matching with the virtual address of the TLB miss exists as a result of the comparison at the virtual address comparison unit 72, the output unit 73 takes out the page size stored together with the virtual address, and supplies to the page size comparison unit 74. The page size comparison unit 74 compares the page size supplied from the output unit 73 with the page size stored at the valid base register BiREG. When the page size matching with the page size supplied from the output unit 73 exists as a result of the comparison at the page size comparison unit 74, the output unit 75 supplies information of the base register BiREG corresponding to the page size to the pointer address generation unit 59. The pointer address generation unit 59 generates a pointer address PTA to search the page table from the information of the base register BiREG supplied from the output unit 75 and the virtual address of the TLB miss. The memory access is performed by using the generated pointer address PTA.

[Process C]

At first, the cache tag unit 60 and the cache data unit 61 are searched in the memory access relating to the page table search. A part of the pointer address PTA is supplied to the cache tag unit 60 as an index, and a tag corresponding to the index is supplied from the cache tag unit 60 to the cache hit detection unit 62. The cache hit detection unit 62 compares the tag supplied from the cache tag unit 60 and the part of the pointer address PTA corresponding to the tag. As a result, when the tag and the part of the pointer address PTA do not match, it is judged that a data corresponding to the pointer address PTA does not exist at the cache data unit 61 (cache miss). At this time, the cache hit detection unit 62 reports the cache miss, and issues a data request REQ4 to the main storage 54. When a data DAT is supplied from the main storage 54 as a response for the data request REQ4, the pointer address PTA and the data DAT from the main storage 54 are registered to the cache tag unit 60 and the cache data unit 61 as a tag and data, and the table search request process is performed again.

When the data corresponding to the pointer address PTA exists at the cache data unit 61, the cache hit detection unit 62 reports a cache hit, the read data of the cache data unit 61 becomes valid, and is output via the output unit 63. The read data of the cache data unit 61 is constituted by a pair of the TLB tag and TLB data. The table hit detection unit 64 reports a table hit when a virtual address as the TLB tag and the virtual address of the TLB miss match, and performs a TLB registration request REQ3 for the TLB unit 56 of the memory management unit 52. The pair of the TLB tag and TLB data is thereby registered to the TLB unit 56, and processes relating to the search of the page table caused by the TLB miss and the entry registration to the TLB unit 56 finishes. The table hit detection unit 64 reports a table miss when the virtual address as the TLB tag and the virtual address of the TLB miss do not match, and the output unit 58 uses it as a trigger and issues a second table search request REQ2.

[Process D]

When the second table search request REQ2 is issued, the counter value comparison unit 77 performs a comparison of the counter values of the usage frequency counters 76 provided by respective base registers BiREG at the address translation control unit 55. The output unit 75 controls the search order in accordance with the comparison result at the counter value comparison unit 77, and supplies the information of the base register BiREG to the pointer address generation unit 59. Note that when the usage frequency counters 76 are each provided for instruction and for operand, the counter value of the usage frequency counter for instruction is compared in the table search request according to the instruction request, and the counter value of the usage frequency counter for operand is compared in the table search request according to the operand request.

As an example, it is assumed that the counter value of the usage frequency counter 76 corresponding to the base register B1REG is two and the counter value of the usage frequency counter 76 corresponding to the base register B2REG is three. Besides, it is assumed that the counter value of the usage frequency counter 76 corresponding to the base register B3REG is four and the counter value of the usage frequency counter 76 corresponding to the base register B4REG is "0" (zero). Here, when the search of the page table according to the history information RI is already performed by the above-stated [process B] and [process C] as for the base register B1REG, the comparisons of the counter values of the usage frequency counters 76 are performed except the base register B1REG. Namely, the counter value comparison unit 77 compares the counter values of the usage frequency counters 76 corresponding to the base registers B2REG, B3REG and B4REG. On the other hand, when the search of the page table according to the history information RI is not performed, the counter value comparison unit 77 compares the counter values of the usage frequency counters 76 corresponding to the base registers B1REG, B2REG, B3REG and B4REG.

Hereinafter, it is described on an assumption that the search of the page table according to the history information RI is already performed as for the base register B1REG. At this time, the search order of the page table is from B3REG, B2REG to B4REG. The pointer address PTA to search the page table is generated by the pointer address generation unit 59 from the information of the base register supplied from the output unit 75 and the virtual address of the TLB miss, and the memory access relating to the page table search is performed. Note that the memory access by using each pointer address PTA is the same as the above-stated [process C], and therefore, the description about the memory access is not given in the following, and a flow of the page table search is described.

[Process D-1: Sequential Mode]

In the sequential mode, the search of the page table by the base register B3REG is performed, and when the table hit detection unit 64 reports the table hit in the search, the TLB registration request REQ3 is performed for the TLB unit 56 of the memory management unit 52. The pair of the TLB tag and TLB data being the read data of the cache data unit 61 is thereby registered to the TLB unit 56, and the processes relating to the search of the page table caused by the TLB miss and the entry registration to the TLB unit 56 finish. On the other hand, when the table hit detection unit 64 reports the table miss in the search of the page table by the base register B3REG, the table search request for the next page table is issued while using it as a trigger. The search of the page table by the base register B2REG is performed as same as the search of the page table by the base register B3REG. Further, when the table hit detection unit 64 reports the table miss also in the search of the page table by the base register B2REG, the table search request for the next page table is issued while using it as a trigger. The search of the page table by the base register B4REG is performed as same as the search of the page table by the base register B3REG.

[Process D-2: Parallel Mode]

In the parallel mode, the page table searches by the plural base registers of which priority orders are high are requested in parallel. Here, an example in which the page table searches by two base registers of which priority orders are high are performed in parallel is described. In the present example, after the search of the page table by the base register B3REG is started, the table search request relating to the search of the page table by the base register B2REG is issued without waiting for the detection result from the table hit detection unit 64.

When the table hit detection unit 64 reports the table hit in the search of the page table by the base register B3REG, the TLB registration request REQ3 is performed for the TLB unit 56 of the memory management unit 52. The pair of the TLB tag and TLB data being the read data of the cache data unit 61 is thereby registered to the TLB unit 56, and the processes relating to the search of the page table caused by the TLB miss and the entry registration to the TLB unit 56 finish. Besides, in this case, if a data request REQ4 is performed for the main storage 54 in the search of the page table by the base register B2REG, the data request REQ4 is completed.

When the table hit detection unit 64 reports the table miss in the search of the page table by the base register B3REG, the search transfers to the process for the base register B2REG. When the table hit detection unit 64 reports the table hit in the search of the page table by the base register B2REG, the TLB registration request REQ3 is performed for the TLB unit 56 of the memory management unit 52. The pair of the TLB tag and TLB data being the read data of the cache data unit 61 is thereby registered to the TLB unit 56, and the processes relating to the search of the page table caused by the TLB miss and the entry registration to the TLB unit 56 finish. On the other hand, when the table hit detection unit 64 reports the table miss in the search of the page table by the base register B2REG, the search of the page table by the base register B4REG is performed.

Note that it is set to perform the search of the page table by the next base register B4REG when the table misses are both reported in the searches of the page tables by the two base registers B3REG, B2REG of which priority orders are high, but it is not limited thereto. For example, the search of the page table by the next base register B4REG may be set to be performed at the time when the table miss is reported in the search of the page table by the base register B3REG.

Besides, for example, when the search of the page table by means of the history information RI is not performed, the searches of the page tables by the base registers B3REG, B2REG of which priority orders are high are performed in parallel. When the tables misses are both reported in the searches, the searches of the page tables by the next two base registers B1REG, B4REG may be performed in parallel as same as the searches of the page tables by the base registers B3REG, B2REG.

Note that in the above-stated description, a case when the search of the page table is performed by the third search mode is described as an example, but the search can be performed by the first search mode or the second search mode. When it is performed by the first search mode, the process may be continued after the output unit 58 issues the second table search request REQ2 [process D] when the TLB miss occurs in the [process A]. Accordingly, it is not necessary for the processor system to include the page size comparison unit 70, the storage unit 71, the virtual address comparison unit 72 and the output unit 73 when only the first search mode is performed. When the search is performed by the second search mode, the searches of the page tables by the remaining respective base registers BiREG are performed in an order defined in advance after the [process A] to the [process C] are performed. Accordingly, it is not necessary for the processor system to include the usage frequency counter 76, the counter value comparison unit 77 and the counter value check unit 78 when only the second search mode is performed.

Hereinafter, writing of the history information RI and the control of the usage frequency counter 76 in the processor system illustrated in FIG. 5 are described.

Writing of History Information RI

When the entry removed from the TLB unit 56 caused by the registration of a new entry is stored at the storage unit 71 as the history information RI, the entry removed from the TLB unit 56 is written to the storage unit 71 as it is when it is stored regardless of the counter value of the usage frequency counter 14-i. Besides, when the writing is limited to only the entries of the page sizes of which counter values are small by referring to the counter value of the usage frequency counter 14-i, the counter value comparison unit 77 compares the counter values of the usage frequency counters 76 corresponding to the respective base registers BiREG. The counter value comparison unit 77 notifies the page size of which counter value is small to the page size comparison unit 70 based on the comparison result. The page size comparison unit 70 compares the page size notified by the counter value comparison unit 77 with the page size of the entry removed from the TLB unit 56, and permits the writing of the entry removed from the TLB unit 56 to the storage unit 71 when they match.

Control of Usage Frequency Counter 76

The control of the usage frequency counter 76 is performed based on signals SG1, SG2, and the output of the counter value check unit 78.

The signal SG1 is a signal notifying an update of the base register BiREG. When the update of the base register BiREG is notified by the signal SG1, for example, the counter values of all usage frequency counters 76 are cleared or reset to an arbitrary value because the counter values up to that time make no sense. For example, it is assumed that the counter value of the usage frequency counter 76 corresponding to the base register B1REG is two, and the counter value of the usage frequency counter 76 corresponding to the base register B2REG is three. Besides, it is assumed that the counter value of the usage frequency counter 76 corresponding to the base register B3REG is four, and the counter value of the usage frequency counter 76 corresponding to the base register B4REG is "0" (zero). When the update of the base register B1REG is notified by the signal SG1 in this state, the counter value of the usage frequency counter 76 corresponding to the base register B1REG is set to be "0" (zero). Besides, the counter values of the usage frequency counters 76 corresponding to the base registers B2REG, B4REG are both set to be "0" (zero), and the counter value of the usage frequency counter 76 corresponding to the base register B3REG is set to be one. As stated above, the counter value of the usage frequency counter 76 of which counter value is the largest among the base registers B2REG, B3REG, B4REG before the base register B1REG is updated is set to be large.

The signal SG2 is a signal to increment the counter value of the usage frequency counter 76 for one when the page table is hit and the TLB registration request REQ3 is issued. When the signal SG2 is asserted, the counter value of the usage frequency counter 76 corresponding to the base register BiREG according to the page table which is hit is incremented for one.

The counter value check unit 78 judges whether the counter value of the usage frequency counter 76 reaches the maximum value or overflows, and outputs a judgment result. When it is judged that the counter value of the usage frequency counter 76 reaches the maximum value or overflows, for example, the counter values of all usage frequency counters 76 are cleared or reset to an arbitrary value. For example, the maximum value of the counter value of the usage frequency counter 76 is set at four, and the counter value of the usage frequency counter 76 is cleared or set to an arbitrary value when it is judged that the counter value reaches the maximum value. It is assumed that the counter value of the usage frequency counter 76 corresponding to the base register B1REG is two, and the counter value of the usage frequency counter 76 corresponding to the base register B2REG is three. Besides, it is assumed that the counter value of the usage frequency counter 76 corresponding to the base register B3REG is four, and the counter value of the usage frequency counter 76 corresponding to the base register B4REG is "0" (zero). At this time, the counter value of the usage frequency counter 76 corresponding to the base register B3REG reaches the maximum value, and therefore, the counter values of the usage frequency counters 76 corresponding to the base registers B1REG, B2REG, B4REG are all set to be "0" (zero). Besides, the counter value of the usage frequency counter 76 corresponding to the base register B3REG is set to be one. It is thereby possible to perform the search from the base register of which counter value before it is cleared is the largest when the search of the page table is performed next time.

Besides, when it is judged that the counter value of the usage frequency counter 76 reaches the maximum value or overflows, for example, the counter values of all usage frequency counters 76 may be decremented for one. For example, when the counter values of the usage frequency counters 76 are as same as the above-stated example, the counter value of the usage frequency counter 76 corresponding to the base register B1REG is set to be one, the counter value of the usage frequency counter 76 corresponding to the base register B2REG is set to be two. Besides, the counter value of the usage frequency counter 76 corresponding to the base register B3REG is set to be three, and the counter value of the usage frequency counter 76 corresponding to the base register B4REG is set to be "0" (zero). It is thereby possible to make a discrimination of the counter values between the base register of the page table of which usage frequency is high and the base register of the page table of which usage frequency is low. Accordingly, it is possible to perform the search of the page tables while giving priority to the base register of which usage frequency is high when the search of the page table is performed next time.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An address translation device, connected to a main storage device which stores page tables holding pairs of virtual addresses and physical addresses by respective page sizes each indicating a size of a page being a unit by which a translation between the virtual address and the physical address is performed and an instruction control unit which issues a memory access request, the address translation device comprising:

an address translation buffer which holds the pairs of the virtual addresses and physical addresses by respective page sizes, and performs the translation between the virtual address and the physical address;

a history holding unit which holds a pair of a virtual address removed from the address translation buffer and page size corresponding to the removed virtual address when a pair of a new virtual address and physical address read from the page table is registered to the address translation buffer;

base registers which hold a base address being a part of the virtual address indicating a segment of the page by each page size; and a memory management unit which searches the address translation buffer based on a translation object virtual address included in the memory access request issued by the instruction control unit, and when a search miss occurs, searches the pairs of the virtual addresses and physical addresses held by the main storage device based on a pointer address indicating an address of the page table at the main storage device generated from the pair of the virtual address and page size held by the history holding unit and the base address held by the base register, and translates the translation object virtual address into the physical address.

2. The address translation device according to claim 1, wherein the memory management unit searches the address translation buffer based on the translation object virtual address, and when the search miss occurs, generates the pointer address from the page size included in a pair with the virtual address matching with the translation object virtual address among the pairs of the virtual addresses and page sizes held by the history holding unit and the base address held by the base register corresponding to the page size included in the pair with the matching virtual address.

3. The address translation device according to claim 1, wherein the base register further includes a counter by each page size, and increments a counter value of the counter held by the base register of the page size corresponding to a registered virtual address when a pair of a new virtual address and physical address is registered to the address translation buffer, and the memory management unit generates the pointer address from the pair of the virtual address and page size held by the history holding unit and the base address held by the base register of the counter of which counter value is a maximum among the counters by respective page sizes held by the base registers when the search miss occurs by the memory access request.

4. The address translation device according to claim 3, wherein the memory management unit searches the pairs of the virtual addresses and physical addresses held by the main storage device in parallel based on plural pointer addresses generated from the pairs of the virtual addresses and page sizes held by the history holding unit and the base addresses held by the base registers of the plural counters of which counter values exceed a certain value among the counters by respective page sizes held by the base registers when the search miss occurs by the memory access request.

5. The address translation device according to claim 3, wherein the memory management unit searches the pairs of the virtual addresses and physical addresses held by the main storage device from a pointer address generated from the pair of the virtual address and page size held by the history holding unit and the base address held by the base register of the counter of which counter value is large among the plural counters of which counter values exceed a certain value in the counters by respective page sizes held by the base registers when the search miss occurs by the memory access request.

6. The address translation device according to claim 1, wherein the base register further includes a counter by each page size, and increments a counter value of the counter held by the base register of the page size corresponding to a registered virtual address when a pair of a new virtual address and physical address is registered to the address translation buffer, and the memory management unit registers a new virtual address and physical address of the page size corresponding to the base register of the counter of which counter value is a minimum among the counters by respective page sizes held by the base registers among pairs of new virtual addresses and physical addresses read from the page table to the address translation buffer.

7. The address translation device according to claim 1, wherein the base register further includes a counter for instruction used for a memory access for instruction and a counter for operand used for a memory access for operand by each page size, increments a counter value of the counter for instruction held by the base register of the page size corresponding to a registered virtual address when a pair of a new virtual address and physical address is registered to the address translation buffer by a memory access request for instruction, and increments a counter value of the counter for operand held by the base register of the page size corresponding to a registered virtual address when a pair of a new virtual address and physical address is registered to the address translation buffer by a memory access request for operand, and the memory management unit generates the pointer address from the pair of the virtual address and page size held by the history holding unit and the base address held by the base register of the counter for instruction of which counter value is a maximum among the counters for instruction by respective page sizes held by the base registers when the search miss occurs by the memory access request for instruction, and generates the pointer address from the pair of the virtual address and page size held by the history holding unit and the base address held by the base register of the counter for operand of which counter value is the maximum among the counters for operand by respective page sizes held by the base registers when the search miss occurs by the memory access request for operand.

8. The address translation device according to claim 7, wherein the memory management unit searches the pairs of the virtual addresses and physical addresses held by the main storage device in parallel based on plural pointer addresses generated from the pairs of the virtual addresses and page sizes held by the history holding unit and the base addresses held by base registers of the plural counters for instruction of which counter values exceed a certain value among the counters for instruction by respective page sizes held by the base registers when the search miss occurs by the memory access request for instruction, and searches the pairs of the virtual addresses and physical addresses held by the main storage device in parallel based on plural pointer addresses generated from the pairs of the virtual addresses and page sizes held by the history holding unit and the base addresses held by base registers of the plural counters for operand of which counter values exceed a certain value among the counters for operand by respective page sizes held by the base register when the search miss occurs by the memory access request for operand.

9. The address translation device according to claim 7, wherein the memory management unit sequentially searches the pairs of the virtual addresses and physical addresses held by the main storage device from a pointer address generated from the pair of the virtual address and page size held by the history holding unit and the base address held by the base register of the counter for instruction of which counter value is a maximum among plural counters for instruction of which counter values exceed a certain value in the counters for instruction by respective page sizes held by the base registers when a search miss occurs by the memory access request for instruction, and sequentially searches the pairs of the virtual addresses and physical addresses held by the main storage device from a pointer address generated from the pair of the virtual address and page size held by the history holding unit and the base address held by the base register of the counter for operand of which counter value is a maximum among the plural counters for operand of which counter values exceed a certain value in the counters for operand by respective page sizes held by the base registers when the search miss occurs by the memory access request for operand.

10. A processing device, connected to a main storage device which stores page tables holding pairs of virtual addresses and physical addresses by respective page sizes each indicating a size of a page being a unit by which a translation between the virtual address and the physical address is performed, the processing device comprising:
    an instruction control unit which issues a memory access request;
    an address translation buffer which holds the pairs of the virtual addresses and physical addresses by respective page sizes, and performs the translation between the virtual address and the physical address;
    a history holding unit which holds a pair of a virtual address removed from the address translation buffer and page size corresponding to the removed virtual address when a pair of a new virtual address and physical address read from the page table is registered to the address translation buffer;
    base registers which hold a base address being a part of the virtual address indicating a segment of the page by each page size; and
    a memory management unit which searches the address translation buffer based on a translation object virtual address included in the memory access request issued by the instruction control unit, and when a search miss occurs, searches the pairs of the virtual addresses and physical addresses held by the main storage device based on a pointer address indicating an address of the page table at the main storage device generated from the pair of the virtual address and page size held by the history holding unit and the base address held by the base register, and translates the translation object virtual address into the physical address.

11. A control method of a processing device connected to a main storage device which stores page tables holding pairs of virtual addresses and physical addresses by respective page sizes each indicating a size of a page being a unit by which a translation between the virtual address and the physical address is performed, the control method of the processing device comprising:
    searching an address translation buffer in which the pairs of the virtual addresses and physical addresses are registered based on a translation object virtual address included in a memory access request issued by an instruction control unit of the processing device by a memory management unit of the processing device; and
    when a search miss occurs by the search of the address translation buffer, searching the pairs of the virtual addresses and physical addresses held by the page table based on a pointer address indicating an address of the page table at the main storage device generated from a pair of a virtual address removed from an address translation buffer and page size corresponding to the removed virtual address held by a history holding unit and a base address being a part of the virtual address indicating a segment of a page held by a base register, and translating the translation object virtual address into the physical address by the memory management unit.

* * * * *